US008818432B2

(12) United States Patent
Tung et al.

(10) Patent No.: US 8,818,432 B2
(45) Date of Patent: Aug. 26, 2014

(54) METHOD AND INTEGRATED ROUTING DEVICE FOR CONTROLLING REMOTE SYSTEMS VIA SHORT MESSAGES

(75) Inventors: Chien Lung Tung, New Taipei (TW); Kuan Wei Cheng, New Taipei (TW)

(73) Assignee: Moxa Inc., New Taipei (TW)

( * ) Notice: Subject to any disclaimer, the term of this patent is extended or adjusted under 35 U.S.C. 154(b) by 762 days.

(21) Appl. No.: 13/115,111

(22) Filed: May 25, 2011

(65) Prior Publication Data

US 2012/0299761 A1 Nov. 29, 2012

(51) Int. Cl.
*H04W 4/12* (2009.01)
*H04L 29/08* (2006.01)
*H04L 12/58* (2006.01)
*H04W 4/14* (2009.01)

(52) U.S. Cl.
CPC .............. *H04L 51/38* (2013.01); *H04L 67/125* (2013.01); *H04W 4/14* (2013.01)
USPC .............................. 455/466; 370/331; 341/176

(58) Field of Classification Search
CPC ......... H04W 4/14; H04W 80/04; G08C 23/04
USPC ............ 455/461, 433; 370/331, 392; 341/176
See application file for complete search history.

(56) References Cited

U.S. PATENT DOCUMENTS

2003/0210695 A1* 11/2003 Henrion ........................ 370/392
2009/0323636 A1* 12/2009 Dillon et al. .................. 370/331

* cited by examiner

*Primary Examiner* — Phuoc H Doan
(74) *Attorney, Agent, or Firm* — Chih Feng Yeh; Huntington IP Consulting Co., Ltd.

(57) ABSTRACT

A method and an integrated routing device for controlling remote systems via short messages are provided. When a mobile communication device controls remote systems via short messages, the method and the integrated routing device verify whether the mobile communication device is a legal commander. When the mobile communication device is verified as a legal commander, the method and the integrated routing device generate a verification code and subtract consumed time caused by message relay from a first control duration to generate a second control duration. The mobile communication device performs remote control during the second control duration. By completing above procedure, the method and the integrated routing device are capable of preventing fatal damages resulted from missing the right timing for executing control commands, and can further improve the efficiency of controlling remote systems via short messages.

18 Claims, 3 Drawing Sheets

METHOD AND INTEGRATED ROUTING DEVICE FOR CONTROLLING REMOTE SYSTEMS VIA SHORT MESSAGES

BACKGROUND OF THE RELATED ART

1. Technical Field

The invention relates to a method and an integrated routing device for controlling remote systems via short messages and, in particular, to a method and an integrated routing device that performs verification and manages control durations.

2. Related Art

The appearance of mobile communications technology not only breaks the limitation of conventional fixed, wired communications, but also promotes the applications of various mobile communication devices. In addition to pure voice communication, current mobile communications further enable different mobile communications users to transmit real-time messages in the formats of text, pictures, audio, and videos via short message service (SMS). The users can also obtain news, financial reports, advertisements, and so on, through specific information distribution servers. At the same time, different mobile service provider also provide various mobile services so that people can enjoy a more convenient communication environment.

In the field of auto-control industry, using short messages for remote controls has become a mature technique. It mainly utilizes the wide service range of mobile service and the convenience of message transmissions to send short messages from a sender to a remote system. By this procedure, the input/output (I/O) device at the remote end is controlled by the control end and the data can also be accessed remotely. For example, a mobile communications user away from a factory can control the anti-theft system or various devices via short messages. Typically, the control commands in such short messages have their durations.

SMS has the features of 'mechanism of storage and transfer' and 'mechanism of transmission verification'. The 'mechanism of storage and transfer' refers to the mechanism of sending a short message from a sending end to a receiving end via a short message service center (SMSC). Therefore, when the receiving end can only receive low signal or cannot receive any short messages due to storage full, the SMSC temporarily holds the short message and sends it to the receiving end repeatedly until the receiving end receives the short message. The 'mechanism of transmission verification' refers to the mechanism that only after the receiving end receives the short message, can the sending end knows that the short message is successfully sent to the receiving end from the SMSC. The sending end, however, does not know how long the short message has been kept at the SMSC.

Based on the above-mentioned two features of SMS, when a short message is used to control a remote system the control command may miss the right time for execution because it is kept at the SMSC for too long. In this case, the remote system (e.g., gate of a reservoir, warning light, siren, etc) may cause serious outcomes because of improper controls. On the other hand, since only users with privileges can send out control commands and such users may send out a series of control commands within a short period of time, the operation load of the remote system may be greatly increased due to overheads in complete verification process for each user, thus negatively affect the performance in remote system. In view of the above-mentioned drawbacks in verification and control duration management, it is necessary to provide a better solution.

SUMMARY

In view of the fact that it is likely for a control command to miss the right timing and to result in serious damages when using short messages to control remote system in the prior art, the invention disclosed a method of using short messages to control remote systems and the integrated routing device thereof.

The disclosed method includes the steps of: receiving a control request short message sent from a mobile communication device from an SMSC by an integrated routing device, wherein the control request short message includes verification information, sending time, and first control duration; recording the receiving time of the control request short message on the integrated routing device; performing verification according to the verification information in the control request short message by the integrated routing device and, when the verification information is valid, generating a unique verification code according to the verification information and recording the verification code in the integrated routing device; computing a delay time according to the receiving time and the sending time by the integrated routing device, and subtracting the delay time from the first duration to generate a second control duration; when the second control duration is greater than zero, generating a request ranted short message that includes the verification code, sending the request granted short message from the integrated routing device to the mobile communication device via the SMSC, and starting timing; and continuously receiving a plurality of control command short messages sent from the mobile communication device by the integrated routing device and, when the time has not reached the second control duration, analyzing each of the received control command short messages and executing the corresponding control when the integrated routing device determines whether each of the control command short messages has the verification code.

The disclosed integrated routing device is suitable for transmissions/receptions of short messages between the SMSC and a mobile communication device, so that the mobile communication device can control a remote system via the integrated routing device. The integrated routing device according to the invention includes: a receiving unit for receiving a control request short message sent from the mobile communication device from the SMSC and for continuously receiving a plurality of control command short messages sent from the mobile communication device after passing verification; an analyzing unit for analyzing verification information, sending time, and first control duration contained in the control request short message and, when the control command short message contains a valid verification code, extracting a control operation from each of the control command short messages; a verifying unit for checking the verification information, when the verification information is valid, generating a unique verification code according to the verification information and recording the verification code, computing a delay time according to the receiving time and the sending time, subtracting the delay time from the first control duration to generate a second control duration, determining whether the second control duration is greater than zero and, when the control command short message is received, judging whether the control command short message has the verification code; and a managing unit for generating a request granted short message including the verification code when verifying unit confirms that the second control duration is greater than zero, sending the request grant short message via the SMSC to the mobile communication device, starting timing, continuously receiving a plurality of control command short messages sent from the mobile communication device while the timing has not reached the second control duration, and executing a control operation corresponding to the control extracted from each of the control command short messages by the analyzing unit.

The disclosed system and method differ from the prior art in that the invention uses verification information to determine whether the mobile communication device is a valid control command sender when controlling a remote system via short messages. When the mobile communication device is a valid control command sender, a verification code is generated. The second control duration of the verification code is defined as the first control duration sent by the mobile communication device minus the consumed time of the short message by the mechanism of storage and transfer. The mobile communication device can then control the remote system within the second control duration.

Using the disclosed technique, the invention can prevent control commands from missing the right timing to be executed on a remote system and thus possibly serious damages. The invention can thus enhance the efficiency of controlling a remote system via short messages.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The terms used in the specification are defined as follows. The short message referred herein is a packet transmitted via short message service (SMS). Short messages sent in SMS are sent from a short message sending end to a short message receiving end via a short message service center (SMSC). Each short message is packetized and analyzed according to the OPC (OLE for Process Control) protocol. Since the OPC is a well-known protocol in the prior art, the header, body and storage format of each message packet are well-defined and will not be repeated herein. Besides, the short messages can be packaged/analyzed using other formats. Since the settings of short message format can be easily modified to meet various requirements for any person skilled in the art, they are not elucidated herein either.

The SMSC referred herein is established by each mobile service provider. Each SMSC receives short messages from sending ends and determines whether to temporarily store or resend short messages according to the conditions of receiving ends.

For the convenience of description, the short messages transmitted between mobile communication devices and integrated routing devices are defined according to the contents therein. The control request short message, request granted short message, control command short message, control failure short message, and report short message are all short messages transmitted via the SMS and only differ in the contents. The mobile communication device sends/receives short messages by connecting to the SMSC via GSM, GPRS, UMTS, HSDPA, HSUPA, CDMA, WCDMA or Wimax.

Figure 1:
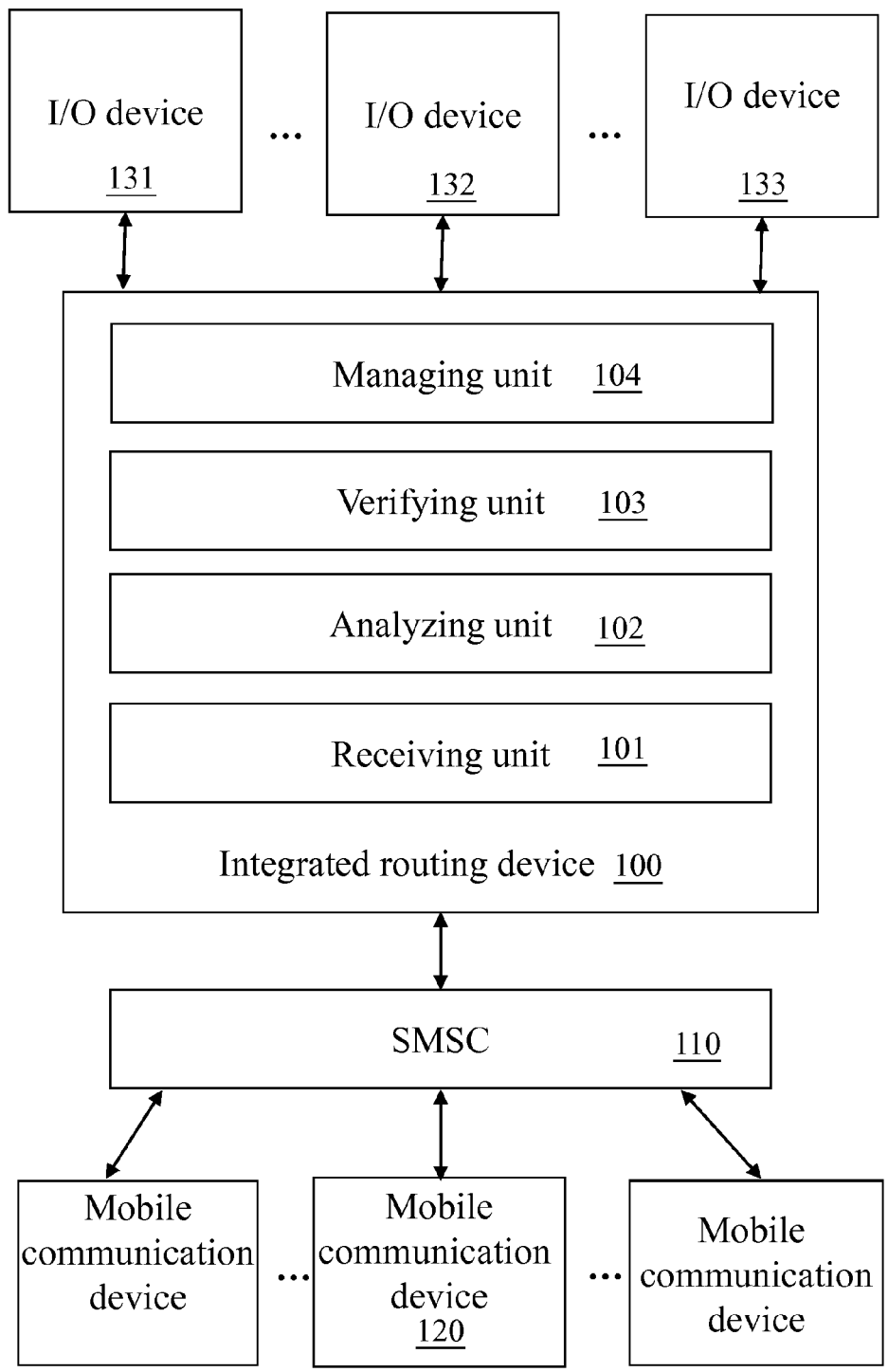
FIG. 1 shows the system chart for controlling a remote system via short messages by using the disclosed integrated routing device 100.

Please refer to FIG. 1 for the system chart for controlling a remote system via short messages by using the disclosed integrated routing device 100.

First, the integrated routing device 100 sends/receives short messages to/from a mobile communication device 120 via a SMSC 110, so that the mobile communication device 120 can remotely control the integrated routing device 100. For convenience, only the interactions between one mobile communication device 120 and the integrated routing device 100 are described. In fact, there can be more than one mobile communication devices that simultaneously send short messages to the integrated routing device 100. The integrated routing device 100 distinguishes different users by verification information contained in each of the short messages.

The integrated routing device 100 according to the invention includes a receiving unit 101, an analyzing unit 102, a verifying unit 103, and a managing unit 104.

The receiving unit 101 receives a control request short message that is sent from the mobile communication device 120 and is passed from the SMSC 110, and then records the corresponding receiving time. When controlling a remote system, the mobile communication device 120 first sends a control request short message containing verification information, sending time, and first control duration to the integrated routing device 100. If the integrated routing device 100 is in a receiving state, the receiving unit 101 receives the control request short message transmitted by the SMSC 110.

When the mobile communication device 120 sends the control request short message, the user can enter a username and password, generate biological characteristics by scanning fingerprints thereof, or use certificate data already existed in the mobile communication device 120 to generate verification information. The verification information is then added to the control request short message according to a predetermined short message input format. According to different verification requirements, the verification information can be an arbitrary combination of the above-mentioned data. For example, one can use both user name and password and biological characteristics simultaneously to enhance the security level in verification.

Besides, the first control duration in the control request short message is a predetermined time range for the remote control. It can be automatically generated once the user decides to send a control command and select from control command categories provided by the system. For example, the control duration for the 'data extraction' control command is set as 5 minutes by default. When the user selects the 'data extraction' control command, the system automatically generates a control duration of 5 minutes and exports it to the control request short message. In addition to automatically generating the control duration according to the user's selection by the system, the first control duration can be generated according to the short message input format preset by the user. For example, an input field in the short message is designed for the user to enter a control duration.

When the mobile communication device 120 sends a control request short message, the system automatically adds a sending time to the control request short message. Afterwards, when the SMSC 110 successfully sends the control request short message to the integrated routing device 100, the receiving unit 101 records the receiving time of the control request short message. The received control request short message includes the verification information, sending time, and the first control duration.

In addition to receiving the control request short message, the receiving module 101 also continuously receives a plurality of control request short message sent from the mobile communication device 120 when the verification information is checked as valid.

The analyzing unit 102 analyzes the verification information, the sending time, and the first control duration contained in the control request short message. When the control command short message contains the valid verification code, i.e. when the verification code in the control command short message matches with the verification code recorded in the integrated routing device 110, the analyzing unit 102 extracts the control operation in the control command short message. When extracting the short message, the analyzing unit 102 can utilize the OPC (OLE for Process Control) protocol for short message analysis. Since the OPC belongs to the prior art and various data packets have different well-defined formats, the details are not repeated herein.

The verifying unit 103 checks whether the verification information is valid. The verification can use the username and password, biological characteristics, certificate data or some arbitrary combination thereof.

When the verification information sent from the mobile communication device 120 is checked by the verifying unit 103 as valid, the verifying unit 103 further uses the verification information to generate a unique verification code and records it. On the other hand, when determining that the verification information is invalid, the verifying unit 103 records the contents and receiving time of the invalid control command short message for generating a warning report in the future. The manager of the integrated routing device 100 can thus check the warning report for system maintenance or monitoring.

After generating and recording the verification code, the verifying unit 103 computes a delay time according to the receiving time of the control request short message and the sending time. The delay time is subtracted from the first control duration to generate a second control duration. The verifying unit 103 checks whether the second control duration is greater than zero. If so, then the managing unit 104 is trigger to start timing.

When the second control duration is greater than zero, it means the control duration sent by the user hasn't expired after the mechanism of storage and transfer in the SMSC 110. The user of the mobile communication device 120 can send out a control command short message in the rest of the time. The verifying unit 103 thus triggers the managing unit 104 to execute the next step. On the other hand, if the second control duration is not greater than zero, it means that it has exceeded the time range for remote control before the control request short message reaches the integrated routing device 100. In this case, the verifying unit 103 triggers the managing unit 104 to generate a control failure short message, which is then transmitted by the SMSC 110 to the mobile communication device 120, notifying the user of the mobile communication device 120 that the control request has been rejected.

The managing unit 104 generates a request granted short message containing the verification code when the verifying unit 103 confirms that the second control duration is greater than zero. The request granted short message is passed by the SMSC 110 to the mobile communication device 120, and meanwhile, the managing unit 104 starts timing. Likewise, when packaging the request granted short message, the managing unit 104 also follows the OPC protocol for short message analysis. This part is not further detailed herein.

When time has not reached the second control duration, the managing unit 104 continuously receives a plurality of control command short message from the mobile communication device 120. If the verifying unit 103 confirms that a valid verification code exists, the managing unit 104 uses the control command extracted by the analyzing unit 102 to trigger the I/O devices 131-133 connected to the integrated routing device 100 to execute the corresponding control operations. On the other hand, when the second control duration is over, the managing unit 104 does not perform any action. It should be noted that the integrated routing device 100 can connect to at least one I/O device 131-133 via serial ports or Ethernet ports. Each of the I/O devices can be an independent host, such as personal computer, a server, etc, or a simple output device, such as printer, factory machine, etc.

Besides, the managing unit 104 also generates a report short message according to the execution result of the control operation and sends the report short message to the mobile communication device 120, thereby notifying the user thereof whether the execution is successful.

Figure 2:
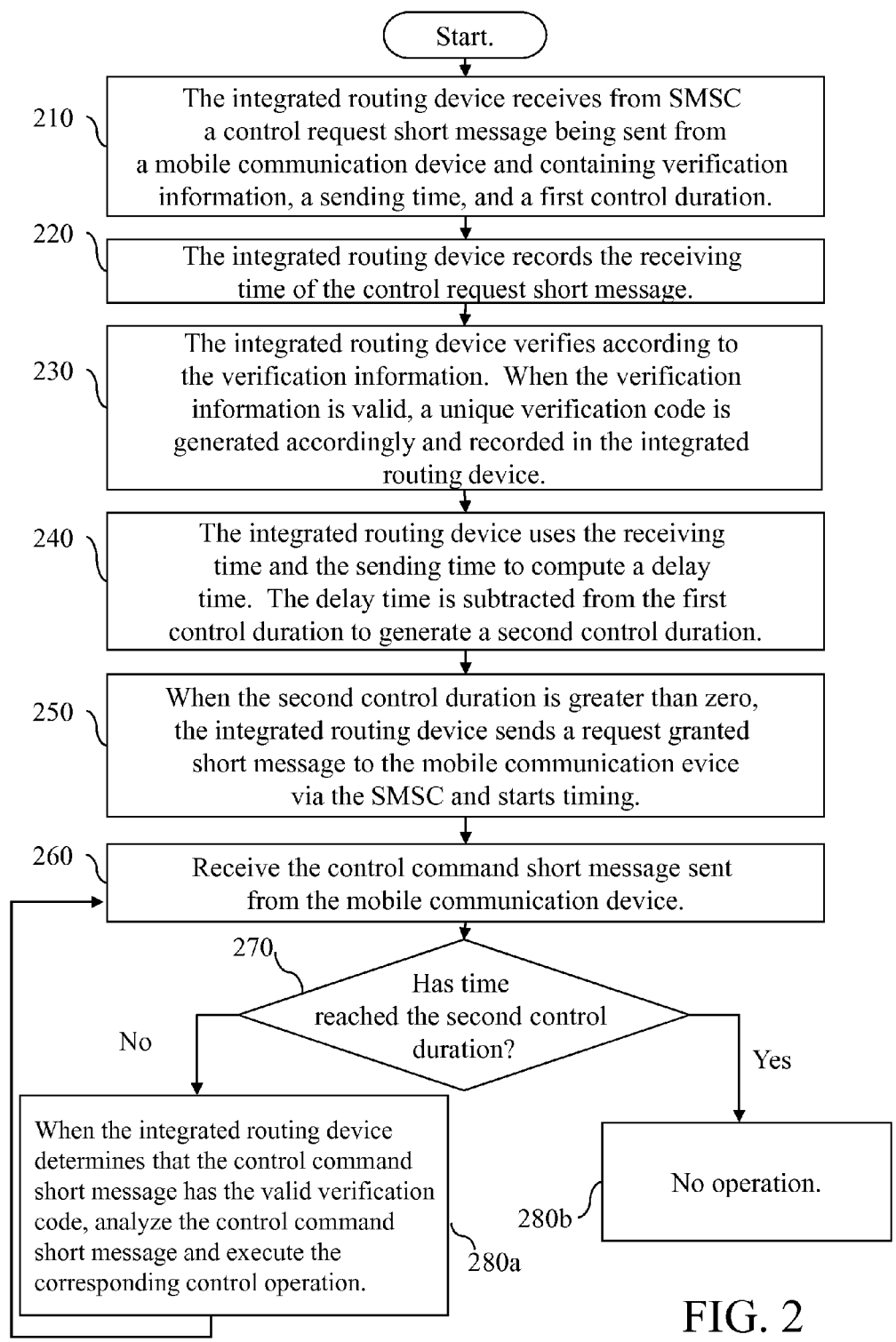
FIG. 2 is a flowchart of the disclosed method of controlling remote system via short messages.

Please refer to FIG. 2 for a flowchart of the disclosed method for controlling remote system via short messages, showing the implementation of the invention.

First, the integrated routing device receives a control request short message containing verification information, sending time, and first control duration sent by the mobile communication device from an SMSC (step 210).

When the mobile communication device sends a control request short message, the user can use a username and password, biological characteristics of scanned fingerprints or certificate data (e.g., SIM card, certificate file, etc) already existed in the mobile communication device to generate verification information. The verification information is added to the control request short message according to a predetermined short message input format. According to different verification requirements, the verification information can be an arbitrary combination of the above-mentioned data, e.g., simultaneously using username and password and biological characteristics, thereby enhancing the security level of verification.

Besides, the first control duration in the control request short message is a predetermined time range for remote control. It can be automatically generated once the user decides to send a control command and select from control command categories provided by the system. For example, the control duration for the 'remote machine operation' control command is set as 20 minutes by default. When the user selects the 'remote machine operation' control command, the system automatically generates a control duration of 20 minutes and exports it to the control request short message. In addition to automatically generating the control duration according to the user's selection by the system, the first control duration can be generated according to the short message input format preset by the user. For example, an input field in the short message is designed for the user to enter a control duration.

When the mobile communication device sends out the control request short message, the system automatically adds the sending time to the control request short message. The control request short message sent to the integrated routing device then includes the verification information, the sending time, and the first control duration. When the control request short message is successfully sent to the integrated routing device via the SMSC, the integrated routing device records the receiving time (step 220).

Afterwards, the integrated routing device checks the verification information. When the verification information is valid, a unique verification code is generated according to the verification information and recorded in the integrated routing device (step 230).

The integrated routing device can employ different methods for verifying the verification information according to practical needs. For example, it can use the username and password, compare the biological characteristics with data stored in a database, or check certificate data sent from the mobile communication device. This embodiment uses the verification information as one example, and should not be used to restrict the actual verification method.

If the verification information sent out by the mobile communication device cannot pass the verification, the integrated routing device classifies the user of the mobile communication device as an invalid control command sender. The integrated routing device records the contents of the control request short message and receiving time, and generates a warning report. The warning report, as a result, can be used for future security checks and further understanding for exception events.

After generating a unique verification code, the integrated routing device computes a delay time according to the receiving time and the sending time. The delay time is then subtracted from the first control duration to obtain a second control duration (step 240).

It should be noted that the first control duration and the second control duration differ in that the former is sent out by the mobile communication device as the time range required for remote control, while the latter is a control duration for the integrated routing device after the short message successfully arrives the integrated routing device via the SMSC.

During the transmission of the control request short message via the SMSC, the integrated routing device may be temporarily unable to receive, therefore the control request short message will be kept in the SMSC for a period of time. Therefore, once the control request short message reaches the integrated routing device, the first control duration in the control request short message has to be checked first. The integrated routing device first uses the sending time and the receiving time of the control request short message to compute a delay time. The delay time is then subtracted from the first control duration to obtain the second control duration. When the second control duration is greater than zero, the integrated routing device sends a request granted short message containing the verification code to the mobile communication device via the SMSC and starts timing (step 250).

It should be noted that if the second control duration is not greater than zero, it means that the control request short message has exceeded the time range for remote control before reaching the integrated routing device. In this case, the integrated routing device generates a control failure short message and sends the control failure short message to the mobile communication device via the SMSC, thereby notifying the user about control failure.

After starting timing, the integrated routing device receives the control command short message sent from the mobile communication device (step 260), and continuously determines whether the second control duration is reached (step 270). When timing has not reached the second control duration, the integrated routing device determines whether the received control command short message contains a valid verification code. If so, then the control command short message is analyzed to perform the corresponding control operation (step 280a). If the timing has reached the second control duration, then the integrated routing device will perform no operation (step 280b).

It should be mentioned that the integrated routing device can be connected with at least one I/O device via serial ports or Ethernet ports. Each of the I/O devices can be an independent host, such as personal computer, a server, etc, or a simple output device, such as printer, factory machine, etc. Therefore, when the timing of the integrated routing device has not reached the second control duration, the user of the mobile communication device can continuously send out control command short messages containing the verification code. After analyzing each of the control command short messages, the integrated routing device triggers the corresponding I/O device to execute data or control I/O. After the I/O device performs the corresponding control operation, the result is returned to the integrated routing device. The integrated routing device then generates a report short message and sends it to the mobile communication device, notifying the user of the mobile communication device of the execution result of remote control.

Moreover, the generation and analysis of control request short message, request granted short message, control command short message, control failure short message, and report short message are packaged or analyzed according to the OPC protocol. Since the OPC belongs to the prior art, it is not further detailed herein. In addition, the short message can be analyzed/packetized in some other format, which can be readily proposed by a person skilled in the art. These are not listed herein.

In the following, an explicit embodiment of using a mobile communication device to control machines in a remote factory via short messages is used to explain the invention.

Figure 3A:
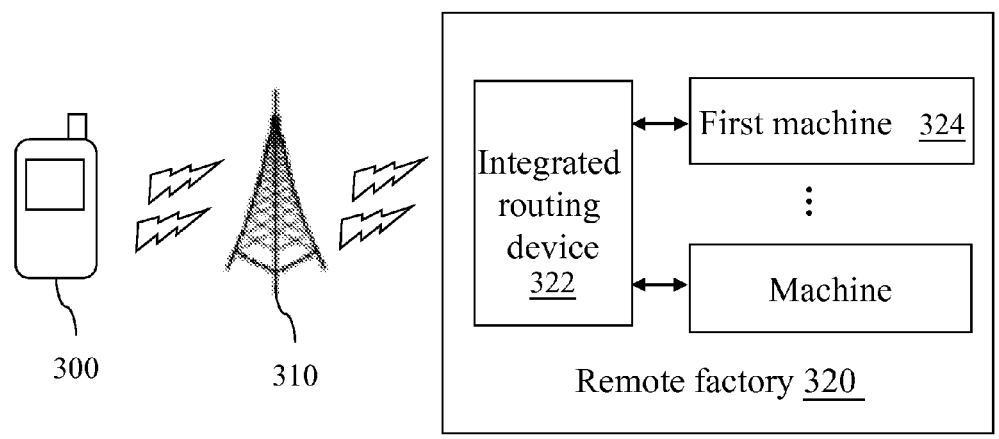
FIG. 3A is a schematic view of an embodiment of the invention.

Please refer to FIG. 3A for the structure of this embodiment, which consists of a mobile communication device 300, a SMSC 310, an integrated routing device 322 in the remote factory 320, and at least one machine. The mobile communication device 300 performs remote control on the machines of the remote factory 320 via SMS.

The mobile communication device 300 in this embodiment is a device that can connect to the SMSC 310 via GSM, GPRS, UMTS, HSDPA, HSUPA, CDMA, WCDMA, or Wimax and send/receive short messages through SMS. Examples are mobile phones, personal digital assistants (PDA's), tablet computers, etc.

In this embodiment, the remote factory 320 receives short messages sent from the SMSC 310 via the integrated routing device 322. After verification and control command analysis, the machines connected to the integrated routing device 322 are triggered to perform the corresponding control operations. The integrated routing device 322 connects to at least one machine of the remote factory 320 through serial ports or Ethernet ports. The machines referred herein are I/O devices of the remote factory 320 that can execute data or control I/O.

When using SMS short messages for remote control, the SMSC 310 determines whether to temporarily hold or resend the short messages depending on the reception conditions of the integrated routing device 322. Therefore, when an SMS short message reaches the integrated routing device 322, the control duration has to be checked. This can prevent the control command from being executed at the right time during the remote control and thus avoid serious damages.

Figure 3B:
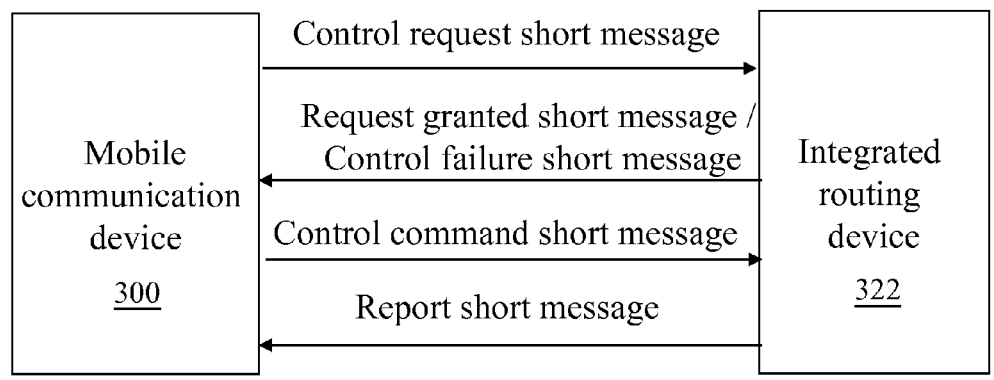
FIG. 3B is a schematic view of data flow in the embodiment.

Please refer to FIGS. 3A and 3B simultaneously. They explain how the mobile communication device 300 in this embodiment performs remote control on the integrated routing device 322 via the SMS.

Suppose the mobile communication device 300 needs to remotely control a first machine 324 of the remote factory 320 so that the first machine 324 executes an assigned task. The mobile communication device 300 first sends a control request short message containing verification information, sending time, and first control duration to the integrated routing device 322. The control request short message is passed by the SMSC 310.

In this embodiment, suppose the verification information is username and password. The user sets the first control duration as $T_b$. When the mobile communication device 300 sends out the control request short message, the sending time $T_a$ is added to the control request short message at the same time.

Afterwards, the integrated routing device 322 receives the control request short message and record the receiving time $T_c$. Using the username and password, the integrated routing device 332 verifies whether the user of the mobile communication device 300 is a valid control command sender. When the user is a valid control command sender, the integrated routing device 322 generates a unique verification code according to the verification information and records it in the integrated routing device 322. If the user is an invalid control command sender, the integrated routing device 322 records the contents of the control request short message and occurring time and generates a warning report for the integrated routing device manager for future security checks and further understanding for exception events.

Afterwards, the integrated routing device 322 uses the receiving time $T_c$ and the sending time $T_a$ to compute a delay time $(T_c-T_a)$. The delay time is subtracted from the first control duration to generate the second control duration $T_b'$. That is, $T_b'=T_b-(T_c-T_a)$. When the second control duration $T_b'>0$, it means that the mobile communication device 300 still has some time left for sending out control commands continuously. The integrated routing device 322 uses the second control duration $T_b'$ as the control duration of the verification code. A request granted short message containing the verification code is sent to the mobile communication device via the SMSC. The integrated routing device 322 then starts timing. If the second control duration $T_b'\leq 0$, then it means that the control request short message may be delayed for too long in the SMSC 310 and may have missed the right timing to reach the integrated routing device 322. The integrated routing device 322 then generates a control failure short message and sends it back to the mobile communication device 300.

After receiving the request granted short message containing the verification code, the mobile communication device 300 can send again the control command short message containing the same verification code to the integrated routing device 322, thereby sending a control command to the first machine 324 of the remote factory 320.

The integrated routing device 322 then continuously receives the control command short message containing the verification code sent from the mobile communication device. During the second control duration $T_b'$, the integrated routing device 322 analyzes the control command short message and triggers the first machine 324 to execute the corresponding control operation. After the second control duration $T_b'$, no action is executed even if the integrated routing device 322 receives a control command short message.

Finally, after the first machine 324 executes the corresponding control operation, the result is returned to the integrated routing device 322. The integrated routing device 322 then generates a report short message and sends it back to the mobile communication device 300, notifying the user of the mobile communication device 300 of the execution result of remote control.

In summary, the invention differs from the prior art in that when the mobile communication device controls a remote system via short messages according to the invention, verification information is checked to determine whether the mobile communication device is a valid control command sender. When the mobile communication device is a valid control command sender, a verification code is generated. The first control duration sent by the mobile communication device is subtracted from the time consumed due to the mechanism of storage and transfer to obtain the second control duration of the verification code. The mobile communication device can then control the remote system during the second control duration. This technique can prevent the control command from missing the right time to be executed during remote control and thus avoid serious damages. Moreover, the invention can enhance the efficiency of remote control via short messages.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of controlling a remote system via short messages, comprising the steps of:
   receiving a control request short message sent from a mobile communication device via a short message service center (SMSC) by an integrated routing device, wherein the control request short message includes verification information, a sending time, and a first control duration;
   recording a receiving time of the control request short message by the integrated routing device;
   checking the verification information in the control request short message by the integrated routing device, when the verification information is valid, generating a unique verification code according to the verification information, and recording the verification code in the integrated routing device;
   computing a delay time according to the receiving time and the sending time by the integrated routing device, and generating a second control duration by subtracting the delay time from the first control duration;
   when the second duration is greater than zero, generating a request granted short message containing the verification code by the integrated routing device, sending the request granted short message to the mobile communication device via the SMSC, and starting timing; and
   continuously receiving a plurality of control command short messages sent from the mobile communication device by the integrated routing device, when the time has not reached the second control duration and the integrated routing device checks that the verification code exists in the control command short message, analyzing each of the control command short messages and executing the corresponding control operation.

2. The method of claim 1 further comprising the step of stopping timing and generating a control failure short message when the second control duration is not greater than zero, and sending the control failure short message to the mobile communication device via the SMSC, after the step of generating a second control duration by subtracting the delay time from the first control duration.

3. The method of claim 1, wherein the integrated routing device connects to at least one input/output (I/O) device for receiving and executing the corresponding control operation, the I/O device being connected to the integrated routing device via a serial port or an Ethernet port.

4. The method of claim 1 further comprising the step of packaging and analyzing a short message according to an OPC (OLE for Process Control) protocol in the step of generating a request granted short message containing the verification code by the integrated routing device and the step of analyzing each of the control command short messages.

5. The method of claim 1, wherein the first control duration is set by default by the mobile communication device system according to the type of control request or by the user.

6. The method of claim 1, wherein the verification information is selected from the group consisting of username and password, biological characteristics, certificate data and some combination thereof.

7. The method of claim 1 further comprising the step of recording the contents of the control request short message and the receiving time and generating a warning report when the verification information is determined as invalid during the step of checking the verification information in the control request short message by the integrated routing device.

8. The method of claim 1 further comprising the step of generating a report short message according to the execution result of the corresponding control operation by the integrated routing device and returning the report short message to the mobile communication device after the step of analyzing each of the control command short messages and executing the corresponding control operation.

9. The method of claim 1, wherein the integrated routing device and the mobile communication device are connected to the SMSC via GSM, GPRS, UMTS, HSDPA, HSUPA, CDMA, WCDMA or Wimax for sending/receiving short messages.

10. An integrated routing device for sending/receiving short messages between an SMSC and a mobile communication device for the mobile communication device to control a remote system via the integrated routing device, the integrated routing device comprising:
   a receiving unit for receiving a control request short message sent from the mobile communication device from the SMSC and recording a receiving time and for continuously receiving a plurality of control command short messages sent from the mobile communication device after verification;
   an analyzing unit for analyzing verification information, a sending time and a first control duration contained in the control request short message and, when the control command short message has a valid verification code, extracting the control operation in the control command short message;
   a verifying unit for verification according to the verification information and, when the verification information is valid, generating a unique verification code according to the verification information and recording the verification code, for computing a delay time according to the receiving time and the sending time, for subtracting the delay time from the first control duration to generate a second control duration, determining whether the second control duration is greater than zero, and for determining whether a received control command short message contains the verification code; and
   a managing unit for generating a request granted short message containing the verification code when the verifying unit confirms that the second control duration is greater than zero, sending the request granted short message to the mobile communication device via the SMSC, and starting time, and for continuously receiving a plurality of control command short messages sent from the mobile communication device when the time has not reached the second control duration and executing a corresponding control operation after the analyzing unit analyzes each of the control command short messages.

11. The integrated routing device of claim 10, wherein the verifying unit triggers the managing unit to generate a control failure short message when the second control duration is not greater than zero and sends the control failure short message to the mobile communication device via the SMSC.

12. The integrated routing device of claim 10 further connecting to at least one I/O device for receiving and executing a corresponding control operation, the I/O device connecting to the integrated routing device via a serial port or Ethernet port.

13. The integrated routing device of claim 10, wherein the analyzing unit analyzes the short messages according to the OPC protocol.

14. The integrated routing device of claim 10, wherein the managing unit packages the short messages according to the OPC protocol.

15. The integrated routing device of claim 10, wherein the first control duration is set by default by the mobile communication device system according to the type of control request or by the user.

16. The integrated routing device of claim 10, wherein the verification information is selected from the group consisting of username and password, biological characteristics, certificate data, and some combination thereof.

17. The integrated routing device of claim 10, wherein the verifying unit records the contents of the control command short message and the receiving time to generate warning report when the verification information is determined as invalid.

18. The integrated routing device of claim 10, wherein the managing unit further generates a report short message according to the execution result of the control operation and returns the report short message to the mobile communication device.

* * * * *